(12) United States Patent
Ward

(10) Patent No.: US 6,868,486 B1
(45) Date of Patent: Mar. 15, 2005

(54) PROVIDING MULTIPLE MEMORY CONTROLLERS ON A MEMORY BUS

(75) Inventor: William P. Ward, Poway, CA (US)

(73) Assignee: NCR Corporation, Dayton, OH (US)

(*) Notice: Subject to any disclaimer, the term of this patent is extended or adjusted under 35 U.S.C. 154(b) by 500 days.

(21) Appl. No.: 09/651,229

(22) Filed: Aug. 25, 2000

(51) Int. Cl.[7] .............................................. G06F 12/06
(52) U.S. Cl. ...................... 711/158; 710/117; 710/45; 710/27; 710/28; 711/157
(58) Field of Search ................................ 711/158, 157, 711/150, 151, 152, 154, 104, 105; 710/117, 45, 27, 28, 22, 107, 113, 311; 327/407

(56) References Cited

U.S. PATENT DOCUMENTS

| | | | | |
|---|---|---|---|---|
| 5,894,586 A | * | 4/1999 | Marks et al. ................. | 710/28 |
| 6,026,464 A | * | 2/2000 | Cohen ........................ | 710/241 |
| 6,076,139 A | * | 6/2000 | Welker et al. .............. | 711/104 |
| 6,178,486 B1 | * | 1/2001 | Gill et al. ................... | 711/151 |
| 6,275,885 B1 | * | 8/2001 | Chin et al. .................. | 710/311 |
| 6,381,658 B1 | * | 4/2002 | Swaminathan .............. | 710/52 |
| 6,393,534 B1 | * | 5/2002 | Chen et al. .................. | 711/158 |
| 6,480,941 B1 | * | 11/2002 | Franke et al. ............... | 711/153 |
| 6,507,886 B1 | * | 1/2003 | Chen et al. .................. | 711/158 |
| 6,522,188 B1 | * | 2/2003 | Poole ......................... | 327/407 |
| 6,567,426 B1 | * | 5/2003 | van Hook et al. .......... | 370/535 |

OTHER PUBLICATIONS

"A Memory Controller For Access Interleaving Over A Single Rambus", Xanthaki, Institute of Computer Science, F.O.R.T.H., Jul. 1994.*

"Preliminary Information, Direct Rambus Memory Controller (RMC2)", www.rambus.com, pp. 1–18, Jul. 2000.*

Zacharenia Xanthaki "A Memory Controller For Interleaving Over A Single Rambus" www.ics.forth.gr/proj/arch–vlsi/sw_arch/interlRambus.ps.gz, Feb., 1994.*

Rambus Inc., *Direct RDRAM 128/144–MBIT* (256K × 16/18×32s), Document DL0059, Version 1.1, pp. 1–66 (dated before the filing date of the present application).

Rambus Inc., *Rambus® Technology Overview*, pp. 1–10 (Aug. 23, 1999).

Rambus Inc., *Direct Rambus™ System and Board Design COnsiderations*, pp. 1–3 (May 1998).

Rambus Inc., *Application for Rambus® Interface Technology*, pp. 1–6 (Feb. 1998).

Rambus Inc., *Rambus®: Protecting High–Availability Systems*, pp. 1–3 (Feb. 2000).

* cited by examiner

Primary Examiner—Pierre-Michel Bataille
(74) Attorney, Agent, or Firm—Trop, Pruner & Hu, P.C.

(57) ABSTRACT

A system comprises a plurality of memory controllers connected to a memory bus. Each memory controller is able to generate memory requests on the memory bus according to a predetermined priority scheme. One priority scheme is a time slot priority scheme, and another priority scheme is a request-select priority scheme. The plurality of memory controllers are able to monitor memory requests generated by another memory controller in performing memory-related actions, such as memory requests (read or write), read-modify-write transaction, and cache coherency actions. In one arrangement, the memory bus is a Rambus channel.

13 Claims, 9 Drawing Sheets

PROVIDING MULTIPLE MEMORY CONTROLLERS ON A MEMORY BUS

TECHNICAL FIELD

The invention relates generally to memory controllers used to control access to memory subsystems.

BACKGROUND

As processor speeds continue to increase, different types of memory devices have been developed to keep up with increased processor speeds. The types of memory devices include static random access memories (SRAMs), dynamic random access memories (DRAMs), synchronous DRAMs (SDRAMs), Rambus® DRAMs (RDRAMs) (from Rambus, Inc.), and other types of memory devices.

In a memory subsystem using RDRAMs, the memory devices are connected to a Rambus channel that is capable of transferring data at up to 800 megahertz (MHz). In one arrangement, a Rambus channel is capable of supporting up to 32 RDRAMs. Basically, an RDRAM is a DRAM that incorporates Rambus interface circuitry. Typically, the Rambus channel is connected to a single memory controller that generates requests for data inside the RDRAMs. Multiple overlapped memory requests can be issued from the memory controller. The memory controller knows the time period required for an RDRAM to respond to a read or write request. For example, the memory controller can issue a read request to the memory device and expect the memory device to return the data in a given number of clock cycles. The memory controller schedules multiple read requests so only one memory device drives read data onto the data bus at any one time. By controlling the timing of the requests, the memory controller can have up to eight memory requests outstanding on the Rambus channel at any given time.

Conventional memory buses such as Rambus channels are usually configured to work with a single memory controller. Typically, the memory bus does not provide for tag data or other forms of identifiers to indicate the destination of data on the memory bus. The memory bus assumes there is only a single memory controller, so any data being returned from a memory device (such as in response to a read request) is targeted for the memory controller.

Although improvements in memory controller designs have enabled efficient memory controller operation, the limitation that only a single memory controller can reside on the memory bus poses various issues. For example, if multiprocessing is desired, a conventional arrangement has multiple processors residing on a host bus that is connected to a single memory controller, which translates requests from the processors to memory requests on a separate memory bus that is connected to memory devices. However, using two buses, a host bus and a memory bus, typically increases memory access delay.

SUMMARY

In general, according to one embodiment, a system comprises a memory bus and a plurality of memory controllers. Each memory controller is able to generate memory requests on the memory bus according to a predetermined priority scheme.

In general, accordance with another embodiment, a system comprises a memory bus and a plurality of memory controllers connected to the memory bus. Each memory controller is able to monitor memory requests generated by another memory controller in performing memory-related actions.

Other features and embodiments will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
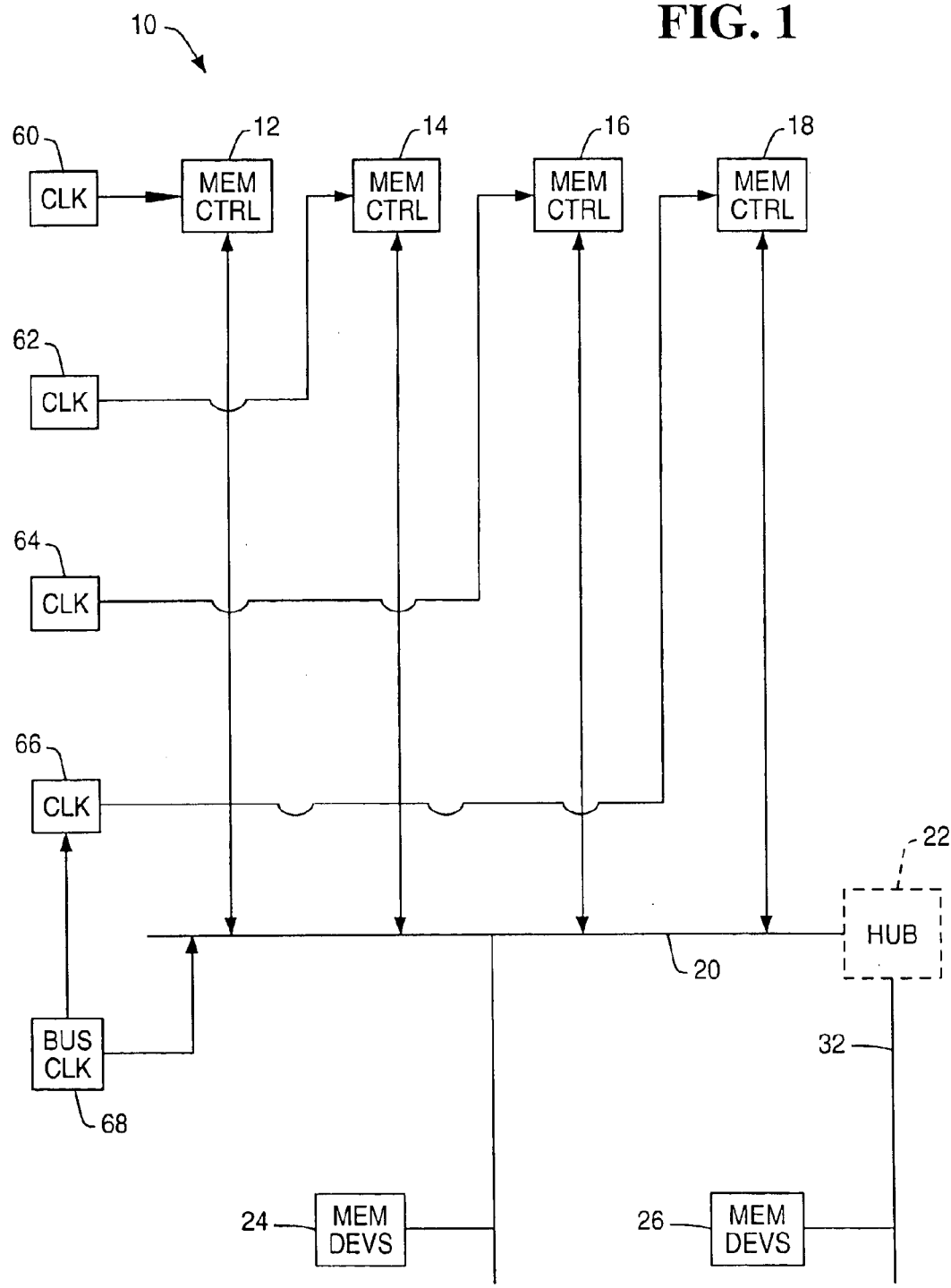
FIG. 1 is a block diagram of an embodiment of a system having multiple memory controllers capable of generating memory requests on a memory bus.

Referring to FIG. 1, in accordance with one embodiment, a system 10 includes multiple memory controllers 12, 14, 16 and 18 that are connected to a memory bus 20. In one example, the memory bus 20 is a Rambus channel. However, other types of memory buses may be employed in further embodiments. Although not shown, the memory controllers 12, 14, 16, and 18 can be associated with one or more central processing units (CPUs). The memory controllers can be embedded in corresponding CPUs, or alternatively, the memory controllers can be separate from but associated with the CPUs.

Optionally, the memory bus 20 is connected to a memory hub 22, which is in turn connected to one or more other memory buses 32. In one example, the one or more other memory buses 32 are also Rambus channels. Effectively, the memory hub is an expander buffer device.

As shown in FIG. 1, a set of memory units 24 are connected to the memory bus 20. If optional memory bus 32 is present, then another set of memory units 26 (connected to the memory bus 32) is accessible by the memory controllers 12, 14, 16 and 18 through the hub 22. The memory units 24 and 26 in one example are Rambus® dynamic random access memories (RDRAMs). In one arrangement, up to 32 RDRAM chips can be connected to a single Rambus channel.

Each of the memory controllers 12, 14, 16, and 18 can generate a memory request on the bus 20 to access the memory units 24 (and optionally, units 26). A memory request includes control and address signaling. In addition, for a write cycle, a memory controller provides write data on the memory bus 20. For a read cycle, an addressed memory unit returns the read data on the memory bus 20. On a Rambus channel, data and control/address signaling are communicated in packets, with each packet being four bus clock cycles in length. Data is transmitted on both the rising and falling edges of the clock. Conventional memory buses such as Rambus channels are usually associated with a single memory controller. As a result, tags or other types of identifiers are usually not provided with data on the memory bus to identify the destination memory controller. Conventionally, it is assumed that all data on the memory bus is associated with the single memory controller. There is also no priority selection mechanism for accessing the data bus because there are no conflicts in accessing the data bus. Thus, if multiple a memory controllers are present, then a technique is needed to enable sharing of the memory bus 20 by the multiple memory controllers.

In one arrangement, a time slot priority scheme is used in which the memory controllers 12, 14, 16 and 18 each generates a request within its assigned time slot. As used here, a "time slot" has a length equal to the length of a packet. Thus, in each time slot, a memory controller can communicate a packet (control or data). The time slot approach is advantageous in systems with more than one Rambus channel. In a system with equal numbers of independent memory controllers and Rambus channels, each memory controller would be enabled on one Rambus channel in each time slot. Most memory read operations are for cache blocks. The Rambus channel data packet delivers 16 bytes of data. This is half to one fourth the size of the cache block in many systems or devices. By interleaving the memory addressing, any single cache block can be spread across all the Rambus channels, so the start of the read access for any processor request for a cache block can start on the next time slot if the memory is not busy.

In another arrangement, instead of a time slot priority scheme, a request-select priority scheme can be used, in which memory controllers 12, 14, 16, and 18 can assert request lines to gain access to the bus 20. In this case, an arbiter (not shown) can be provided on the bus 20 to arbitrate between requests from the memory controllers. Alternatively, one of the memory controllers or all of the memory controllers 12, 14, 16, and 18 can be designated as the arbiter. Since a memory bus has separate row and column buses, a separate request selection scheme may be employed for each of the row and column buses. Alternatively, request selection may be performed on the row bus, with a predetermined delay set for access to the column bus. Further, data on the data bus also occurs a predetermined time after a read or write command has been communicated on the column bus.

To implement the time slot priority scheme for the four memory controllers 12, 14, 16, and 18, four control clocks (represented as blocks 60, 62, 64 and 66) are provided to the corresponding four memory controllers. The active states of the control clocks 60, 62, 64 and 66 are out of phase so that each processor is enabled for access to the memory bus 20 during its assigned time slot. The control clocks 60, 62, 64 and 66 are synchronized to the memory bus clock (represented as block 68). On a Rambus channel, the bus clock 66 can run at up to 400 MHz with data transfers on both clock edges. Although separate blocks are used to represent the clocks 60, 62, 64, 66, and 68, the clocks can all be generated by the same clock generator.

Control and data information from the memory controllers 12, 14, 16, and 18 are transferred to the memory bus 20.

The addressed one of the memory units 24 responds to the requesting memory controller. A predetermined time delay is provided between a request from the memory controller and data returning from the addressed memory unit. Because of this latency, the memory controllers 12, 14, 16 and 18 can time their requests so that data from the memory units come back in different time slots to the memory controllers. Thus, for example, the memory controller 12 can issue a first request, followed by the memory controllers 14, 16 and 18, successively. The multiple memory controllers 12, 14, 16, and 18 can have multiple memory requests outstanding on the memory bus 20. Each memory controller 12 tracks memory requests from other memory controllers.

Figure 2:
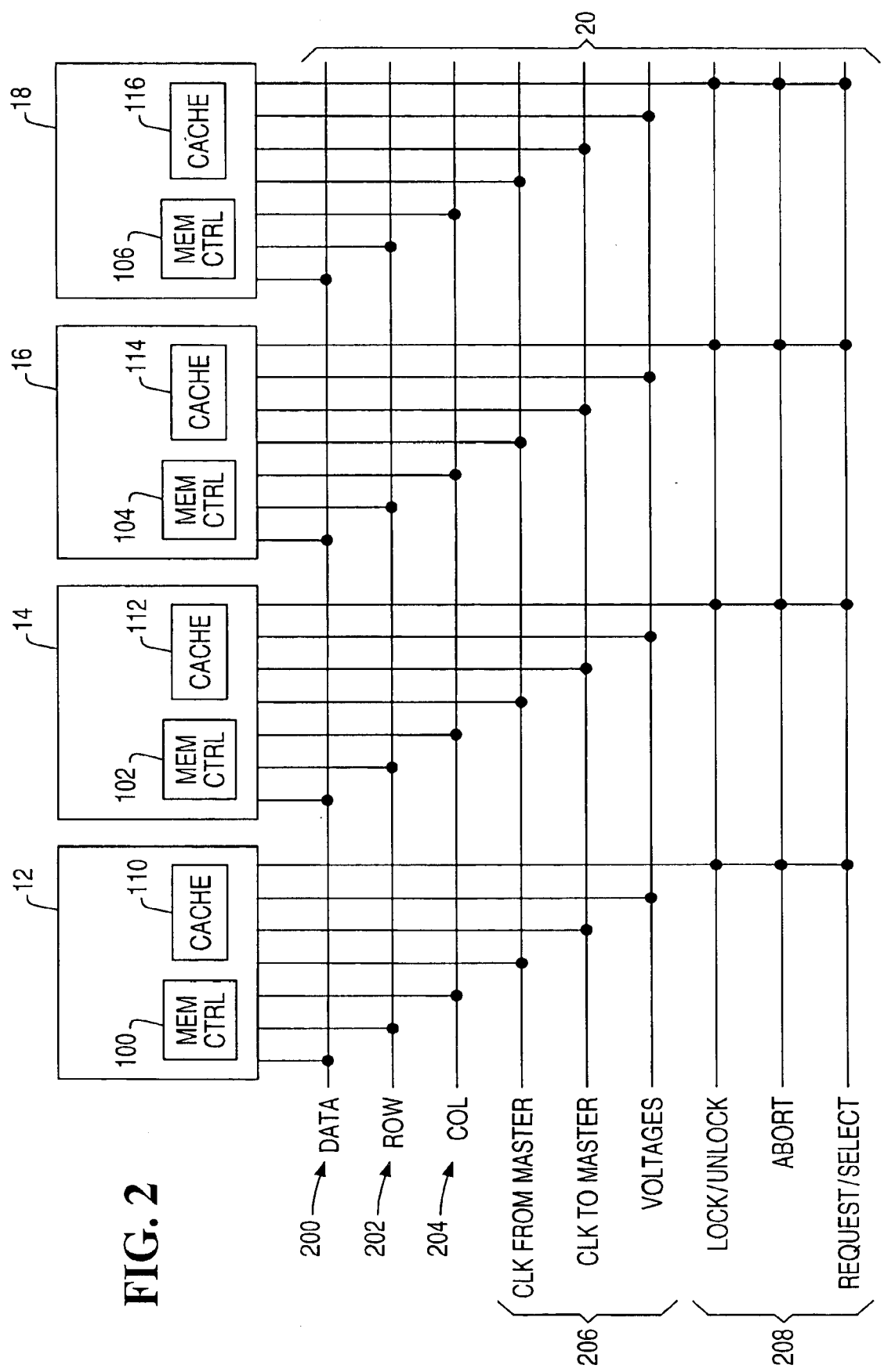
FIG. 2 illustrates a plurality of memory controllers connected to the memory bus in the system of FIG. 1.

As shown in FIG. 2, the memory bus 20 (implemented as a Rambus channel in the illustrated embodiment) is separated into several major portions: a data bus 200; a row command/address bus 202 (hereinafter "row bus"); a column command/address bus 204 (hereinafter "column bus"); Rambus channel control signals 206; and special signals 208 provided to enable lock and cache control between the memory controllers 12, 14, 16 and 18. Further, the special signals 208 include request/select signal(s) if a request/select priority scheme is used.

Communication of the various signals are handled by memory control portions 100, 102, 104, and 106 in respective memory controllers 12, 14, 16, and 18. Cache control portions 110, 112, 114 and 116 may also be involved for cache coherency purposes. The cache control portions 110, 112, 114, and 116 manage associated caches, which can be level-one (L1) or level-two (L2) caches.

In one arrangement of the Rambus channel, the data bus is a 16-bit data bus containing signals DQA[8:0] and DQB [8:0]. The row control/address bus 202 includes ROW[2:0] signals and the column control/address bus 204 includes COL[4:0] signals. The row, column and data buses can operate independently of each other. This allows commands, addresses, and data to be communicated concurrently to different banks of RDRAMs or from different RDRAM devices. The control signals include a clock-to-master signal ClkToMaster (and its complement) and a clock-from-master signal ClkFromMaster (and its complement). The voltages include various supply, reference, and ground voltages. Also, the control signals 206 include signals used for initialization (not shown).

Row packets are sent across the three ROW[2:0] pins of the row bus. Row packets include two types of commands: activate (ACT) or precharge (PRER). Column packets are sent across the five COL[4:0] pins of the column bus. The COL packets are split into two fields. The first field specifies the primary operation, such as a read or write. The second field can be either masks, for writes, or an extended operation command. Each data packet communicated over the DQA[8:0] and DQB[8:0] pins contains 16 bytes of data.

A read operation is generally performed by asserting an ACT command across the ROW pins followed by a read command across the COL pins. Read data is returned in a predetermined number of bus cycles from the end of the read command. This read delay can be varied in the system to accommodate different bus arrangements. The timing of write transaction commands is similar to those of read transactions, with a write command sent in the same way as a read command. The write data for a write transaction is delayed to match the timing of a data transfer of a read transaction.

The special signals 208 include a LOCK/UNLOCK signal that can be used to enable read-modify-write cycles. In one embodiment, separate LOCK and UNLOCK signals are used. In another embodiment, the LOCK/UNLOCK signal is a single signal in which a low or high state indicates whether a lock is in place. The purpose of asserting a lock is to prevent a second memory controller from modifying a memory location after it has been read by the first memory controller but before the first memory controller has been written back to memory.

The special signals 208 also include an ABORT signal to enable a cache control portion in a first memory controller to abort a read or write access from another memory controller if the cache associated with the first memory controller contains modified data. Also, one or more REQUEST/SELECT signals can be part of the special signals 208 to enable a request-select priority scheme. If a time slot priority scheme is used, however, then the REQUEST/SELECT signals are not needed.

Figure 3:
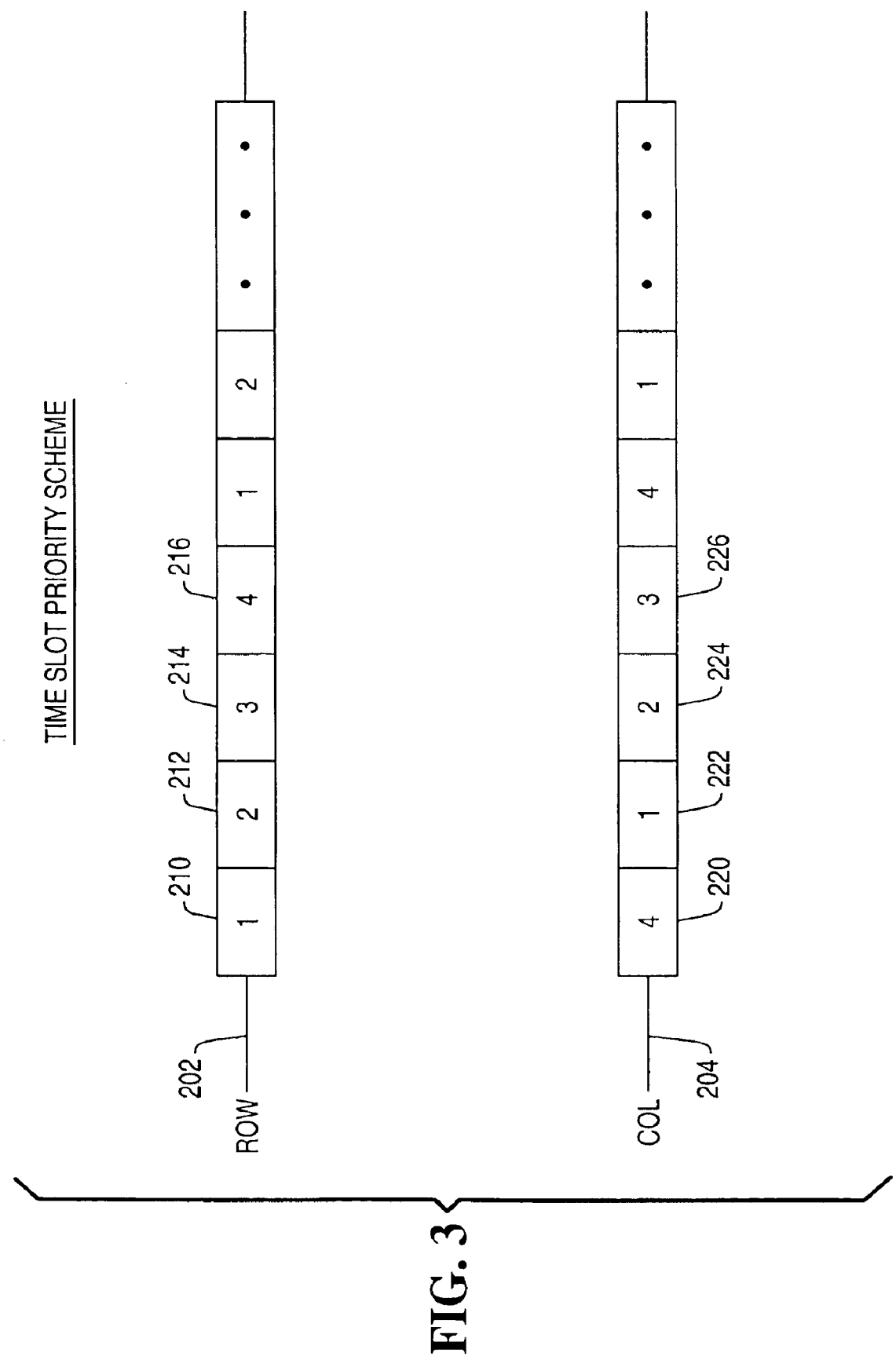
FIG. 3 illustrates a time slot priority scheme for access to the memory bus by the plurality of memory controllers of FIG. 2.

Referring to FIG. 3, the time slot priority scheme on the row and column buses 202 and 204 is illustrated. Each illustrated box represents a time slot on the corresponding bus. Thus, for example, for a four-memory controller system, four time slots can be defined in which a different memory controller is able to communicate a packet during that time slot. Thus, as shown in FIG. 3, a first time slot 210 on the row bus 202 is allocated to memory controller 1, a second time slot 212 is allocated to memory controller 2, a third time slot 214 is allocated to memory controller 3, and a fourth time slot 216 is allocated to memory controller 4. This pattern is then repeated in round robin fashion. Similarly, on the column bus 204, a first time slot 220 is allocated to memory controller 4, a second time slot 222 is allocated to memory controller 1, a third time slot 224 is allocated to memory controller 2, and a fourth time slot 226 is allocated to memory controller 3. The staggering between the row and column buses 202 and 204 is provided since the memory controller typically asserts a row command/address packet followed by a column command/address packet.

To control when a memory controller is active on the memory bus, the control clocks 60, 62, 64 and 66 (FIG. 1) are used. As noted above, the active states of the control clocks 60, 62, 64 and 66 are phased to provide the time slot arrangement. The memory controller is enabled to generate memory requests when its associated control clock is active. For the independent row and column buses, the control clock 60, 62, 64 or 68 can be used to derive the time slot arrangement for each of the row and column buses. Each memory controller can have an internal delay mechanism that is based on the control clock 60, 62, 64 or 68 to determine when it is active on the row bus and column bus.

By enabling the connection of multiple memory controllers to a single bus (or to plural buses), flexibility is provided in how the system 10 can be arranged. For example, the system 10 can be a multiprocessor system, with each memory controller associated with a respective CPU. The system 10 can also be a uniprocessor system, with the plural memory controllers provided to enhance memory access speeds and to increase bandwidth.

Figure 4:
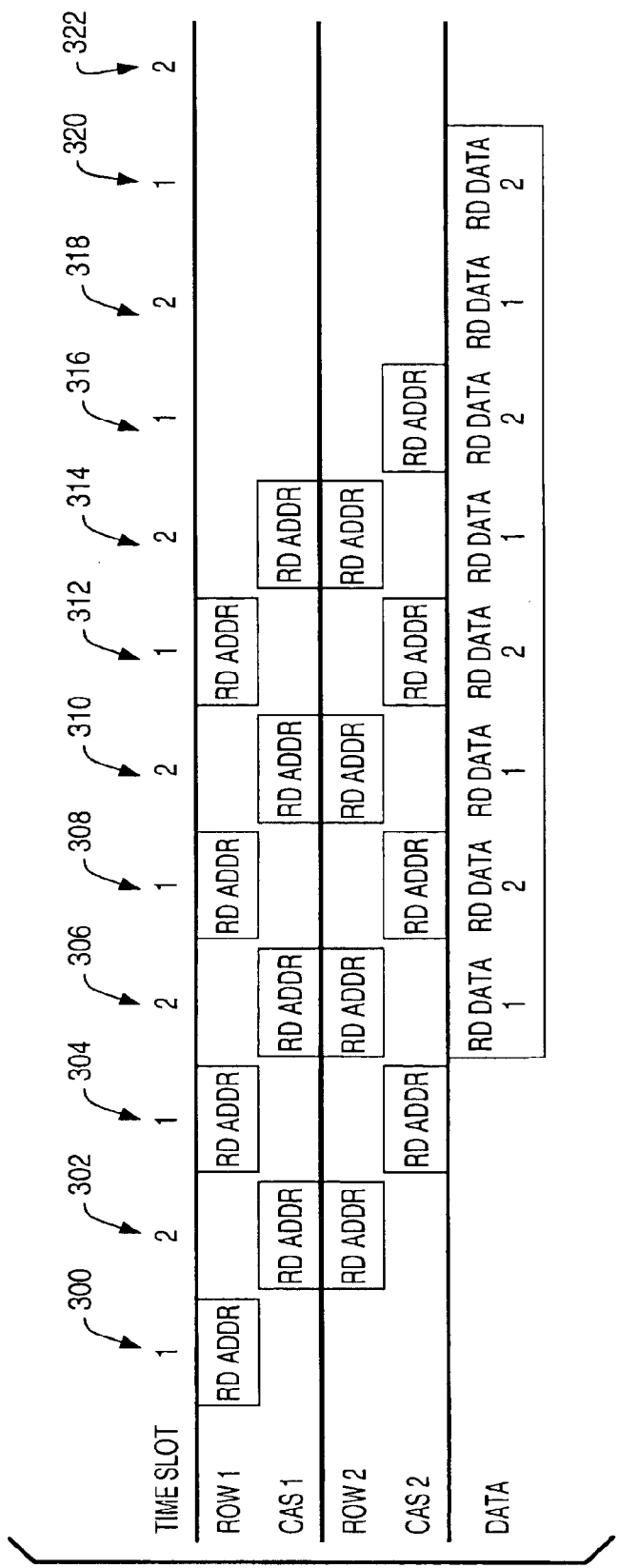
FIG. 4 illustrates a series of read transactions from multiple memory controllers in accordance with an example.

Referring to FIG. 4, a timing diagram for a series of read transactions is shown for two memory controllers (memory controller 1 and memory controller 2). The example can also be extended for more than two memory controllers. In time slot 300, memory controller 1 places a first row command packet on the row bus 202. In the next time slot 302, memory controller 1 places the column command packet (read command) on the column bus 204. In the same time slot 302, memory controller 2 places its first row command packet on the row bus 202, since the row bus is not being used by memory controller 1 during this time slot. In the next time slot 304, memory controller 1 places its second row command packet on the row bus 202 and memory controller 2 places its first column command packet on the column bus 304. In time slot 306, memory controller 1 provides its second column command packet on the column bus 202, and memory controller 2 places its second row command packet on the row bus 202. In the same time slot 306, read data is transmitted by an addressed memory unit on the data bus 200, the read data being the data requested by memory controller 1 in time slots 300 and 302. In the next time slot 308, read data requested by memory controller 2 is returned on the data bus 200. In the same time slot 308, memory controller 1 places its third row command packet on the row bus 202, while memory controller 2 places its second column command packet on the column bus 204. Successive row and column packets along with read data are communicated in subsequent time slots 310, 312, 314, 316, 318, 320 and 322 until all requested data have been returned to memory controllers 1 and 2.

As illustrated, the two memory controllers are able to interleave the row and column command packets so that use of the row and column buses is optimized.

Figure 5:
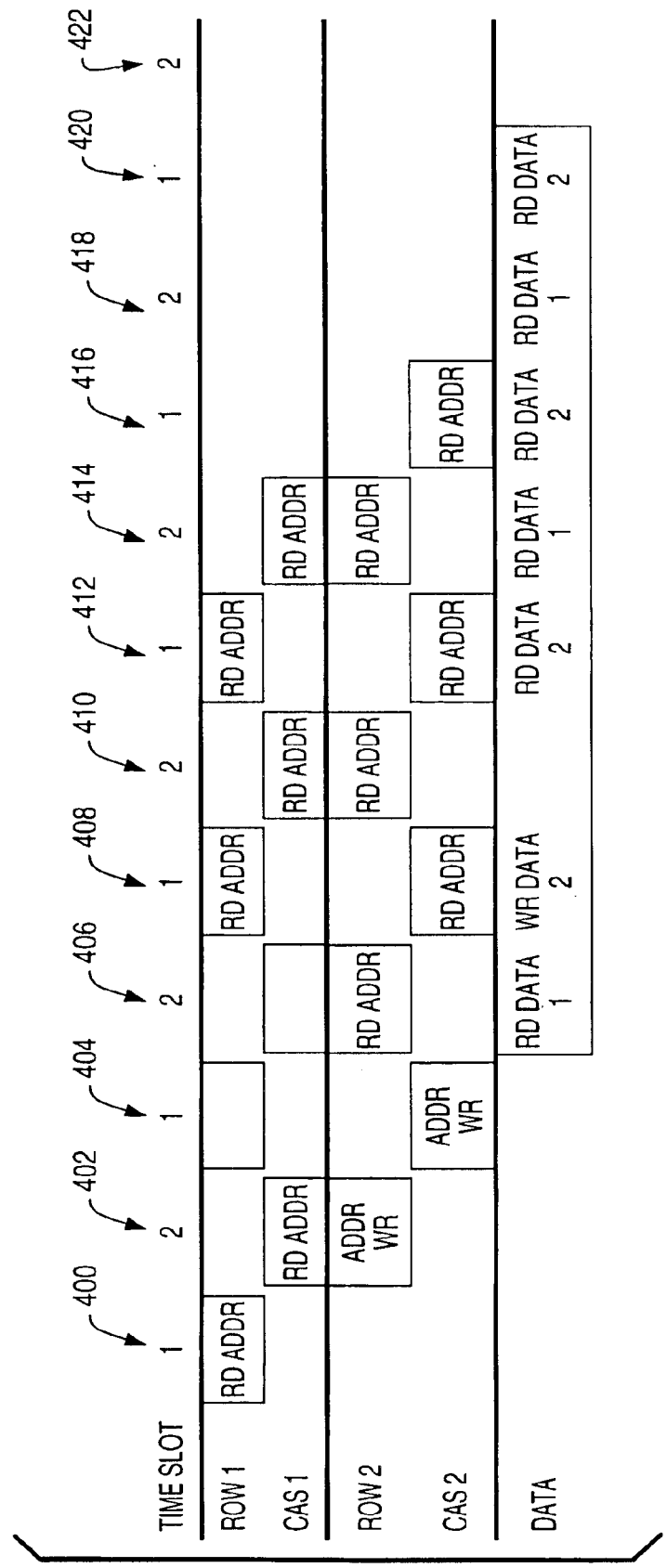
FIG. 5 illustrates a series of read and write transactions from multiple memory controllers in accordance with an example.

Referring to FIG. 5, a timing diagram for a series of read and write transactions is illustrated. In a first time slot 400, memory controller 1 places its first row command packet on the row bus 202. In the next time slot 402, memory controller 1 places its first column command packet (read command) on the column bus 402, while memory controller 2 places its first row command packet on the row bus 202. In the next time slot 404, memory controller 2 places its first column command packet (write command) on the column bus 204. However, in this time slot, memory controller 1 does not drive either the row or column buses since a wait cycle is needed between writes and reads on the data bus 200.

In the next time slot 406, memory controller 2 places its second row command packet on the row bus 202. In the same time slot 406, the read data for memory controller 1 is returned on the data bus 200.

In the next time slot 408, memory controller 1 places its second row command packet on the row bus 202, and memory controller 2 places its second column command packet (read command) on the column bus 204. In the same time 408, memory controller 12 places write data on the data bus 200 for writing to the addressed memory unit. As illustrated, the delay between the write command and the write data is set to match the delay between a read command and read data.

In the next time slot 410, memory controller 1 places its second column command packet (read command) on the column bus 204, and memory controller 2 places its third row command packet on the row bus 202. However, the data bus is idle in this time slot to provide the wait period between write data and read data.

In the next time slot 412, memory controller 1 places its third row command packet on the row bus, and memory controller 2 places its third column command packet (read command) on the column bus. Also, read data for memory controller 2 is returned on the data bus 200 in time slot 412. A series of subsequent reads are then performed in time slots 414, 416, 418, 420 and 422.

The memory controllers monitor command packets (control and address) communicated by other memory controllers to determine what memory transactions are occurring. By monitoring what other memory controllers are doing, each controller can avoid issuing a request that may conflict with another memory controller. Also, by monitoring the memory requests, lock and cache control may also be performed to maintain data integrity.

Figure 6:
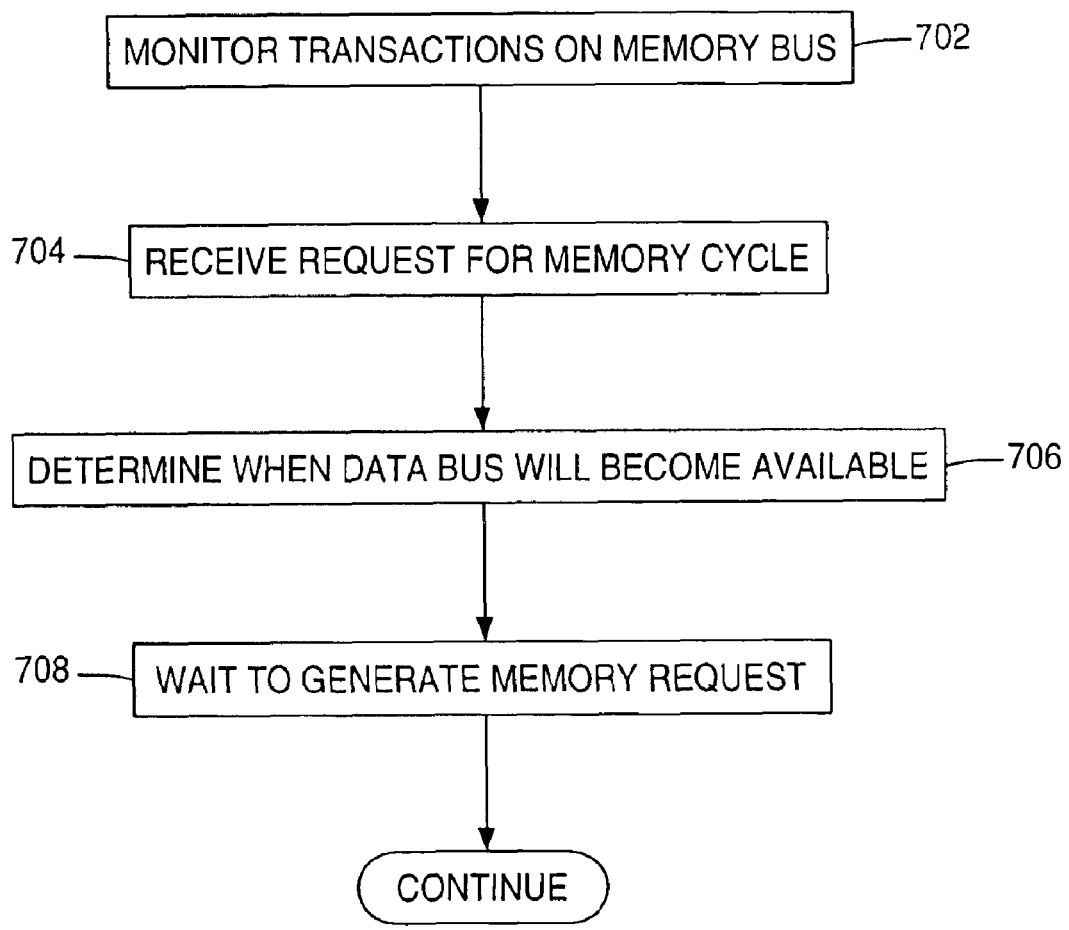
FIG. 6 is a flow diagram of acts performed by a memory controller to determine timing for generating a memory request.

Referring to FIG. 6, a memory controller monitors (at 702) transactions on the memory bus. Such monitoring involves monitoring the commands and addresses communicated in packets issued by other memory controllers. When the memory controller receives (at 704) a request to generate a memory cycle (read, write, refresh, etc.), it determines when the data bus will become available (at 706). This is performed by determining what requests are outstanding, and when the data buses may be occupied or otherwise be unavailable. For example, a write transaction may have been performed by another memory controller that would require a wait cycle to be inserted on the data bus. In this instance, the memory controller desiring to issue a memory request may skip one time slot to prevent a memory conflict on the data bus. Thus, if necessary, the memory controller waits (at 708) to generate the desired memory request.

During initialization, one or more of the memory controllers is assigned the task of making all of the memory refresh requests to memory.

Figure 7:
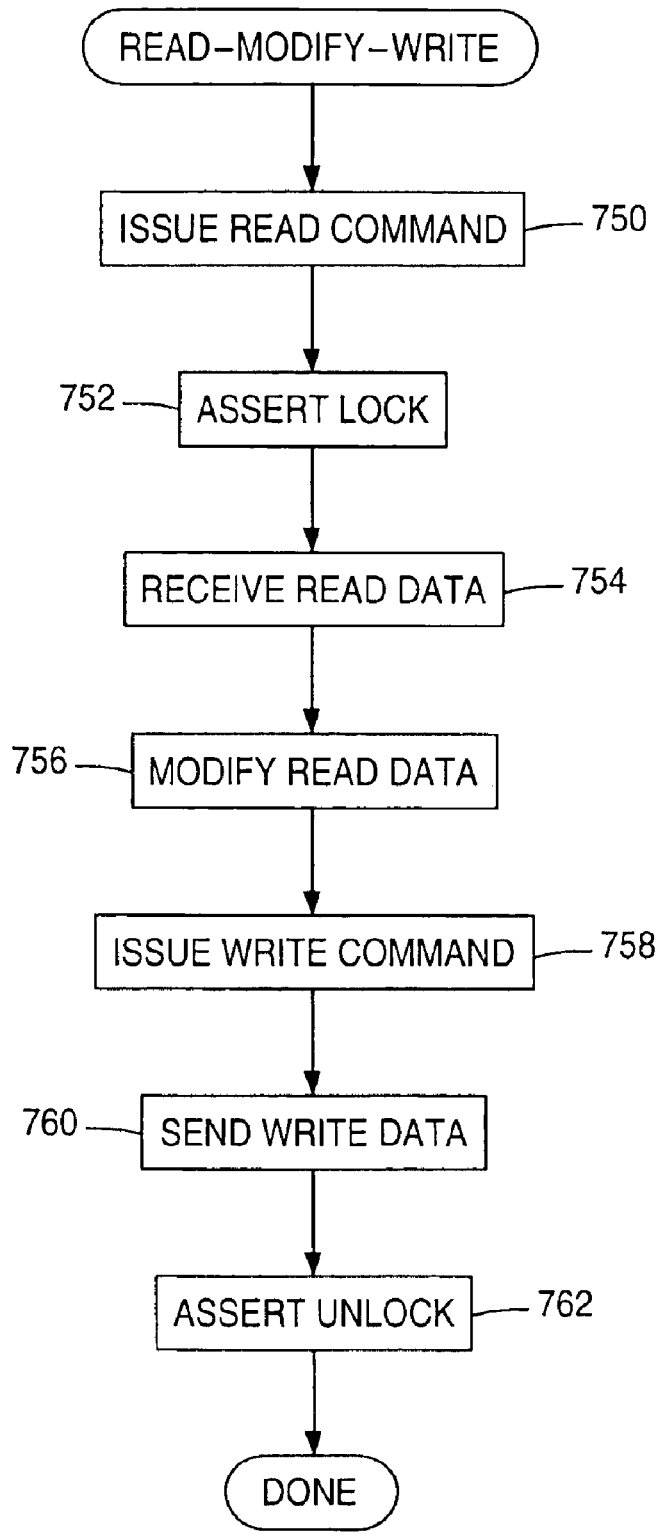
FIG. 7 is a flow diagram of acts performed by a memory controller for a read-modify-write transaction.

Interaction between the multiple memory controllers is also needed to handle read-modify-write transactions. A read-modify-write transaction involves reading data from an address location in a memory device, modifying the data in the memory controller (or other device such as a CPU), and writing the modified data back to the same address location. During the time between the read and write steps, access (read or write) by other memory controllers to the same address location should be prevented. Referring to FIG. 7, to perform a read-modify-write transaction the memory controller issues (at 750) the necessary row and column commands to perform a read transaction. Next, the memory controller asserts a LOCK signal (at 752) to lock the accessed memory location. The memory controller receives the read data (at 754) and modifies the read data (at 756). The memory controller then issues a write command (at 758) back to the same address location. Some predetermined time later, the memory controller sends the write data (at 760) to the memory unit. When the write cycle is completed, the memory controller asserts the UNLOCK signal (at 762) to enable other memory controllers to access the desired data.

Figure 8:
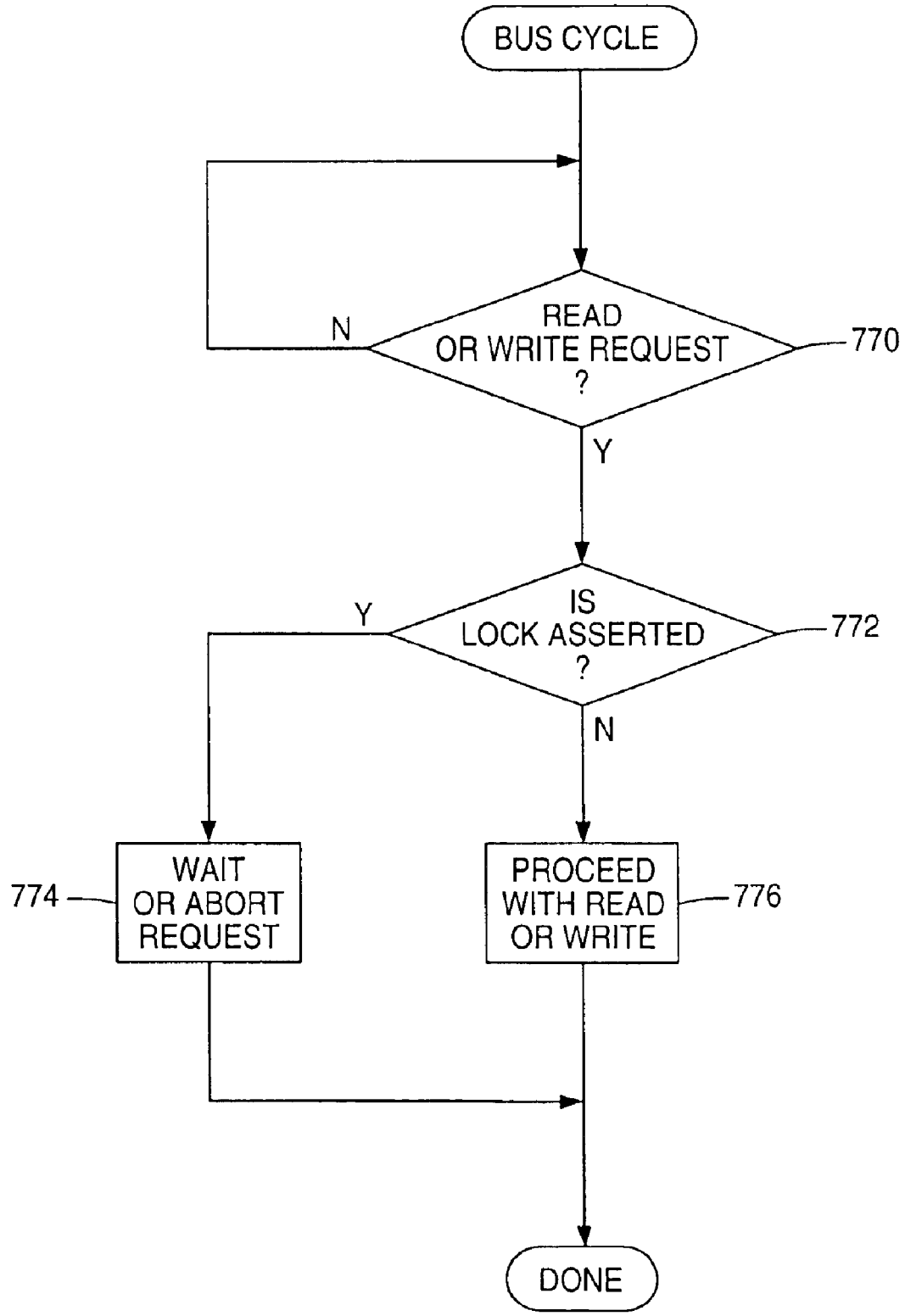
FIG. 8 is a flow diagram of acts performed by a memory controller to initiate a read or write request.

Referring to FIG. 8, when a memory controller receives an indication (such as from an associated CPU) to generate a read or write request (at 770), the memory controller first checks (at 772) to determine if a lock has been asserted for the requested memory location. If so, the memory controller waits (at 774) until the lock has been released. If a lock is not asserted, the memory controller proceeds (at 776) with the read or write request.

Figure 9:
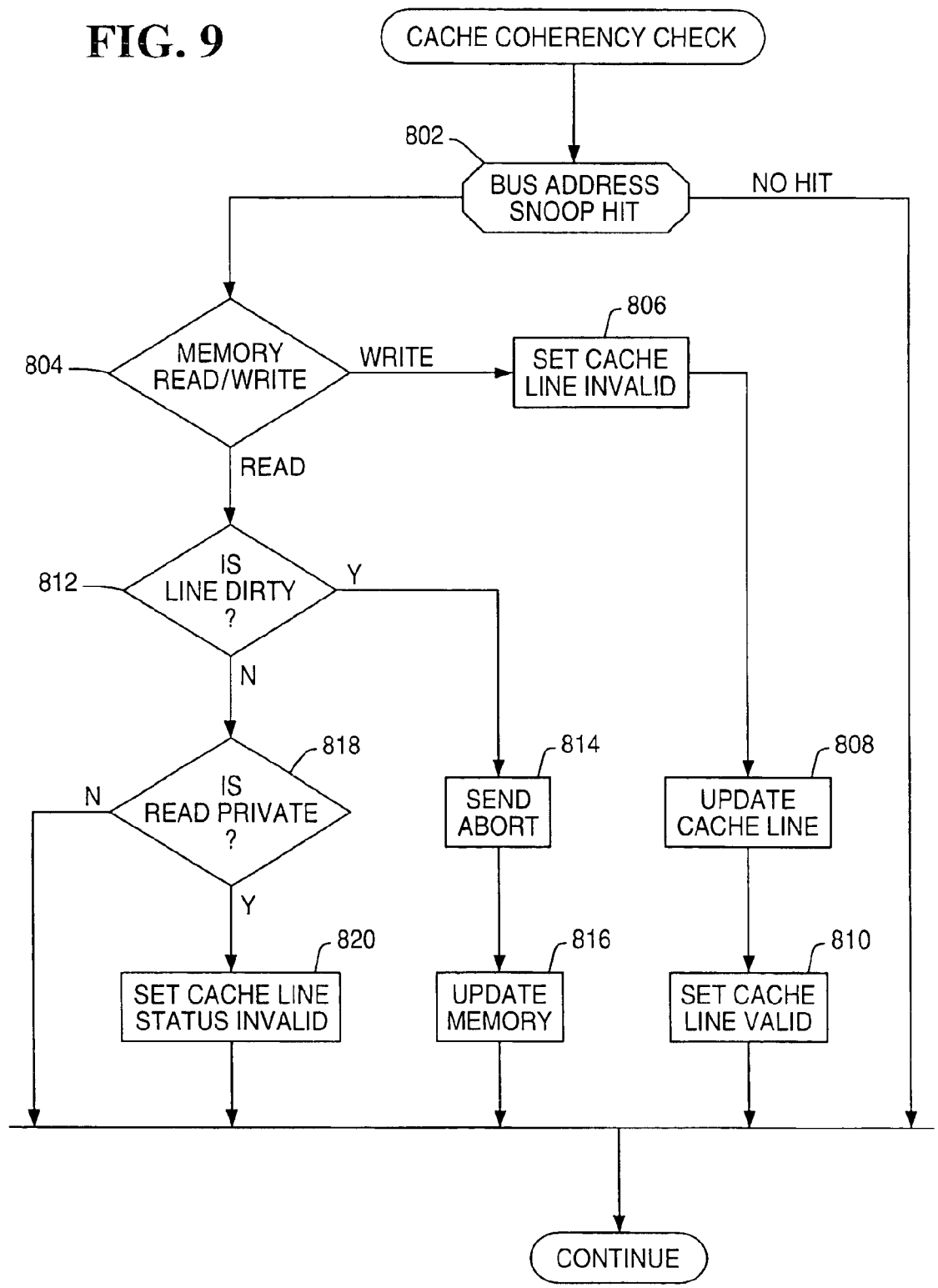
FIG. 9 is a flow diagram of acts performed by a memory controller and cache controller to maintain cache coherency among the caches present in the system of FIG. 1.

Referring to FIG. 9, acts performed by the memory controller (involving the memory control and cache control portions) for cache coherency is illustrated. The memory controller first determines if an address snoop hit event has been received (at 802), which occurs when the memory controller detects a memory address on the row 4 and column buses that matches the memory address of a cache line stored in the associated cache.

When a snoop hit event is received, the memory controller determines (at 804) if the memory request is a read or write. If the request is a write, then the memory controller sets (at 806) the state of the cache line to invalid. At some later point, the memory controller may issue read requests to update (at 808) the cache line with the latest data. After the update, the cache line is set (at 810) to the valid state.

If the bus transaction that caused the snoop hit is a read transaction, the memory controller determines (at 812) if the cache line corresponding to the address of the read transaction contains dirty (or modified) data. If the cache line contains dirty data, then the memory controller asserts (at 814) the ABORT signal, which is received by the requesting memory controller. After asserting the ABORT signal, the memory controller issues a write command (at 816) to write the updated cache line back to the memory subsystem. As the cache line is being written back to the memory subsystem, the other memory controller will see the write data and update its cache accordingly.

If the memory controller determines (at 812) that the cache line does not contain modified data, the memory controller then determines (at 818) if the read transaction is a private or shared read. A private read is typically performed by a device wishing to modify the data. If the read is determined to be a shared read (at 818), then no further cache action is needed. However, if the read is a private read, then the memory controller sets (at 820) the cache line to the invalid status.

The memory controllers described herein may be implemented in one of a number of different ways. They can be incorporated into associated CPUs. Alternatively, they can be implemented as separate controllers in various types of integrated circuit chips, such as application specific integrated circuit (ASIC) devices, programmable gate array (PGA) devices, microcontrollers, and so forth. In addition, the controllers can be programmable with software. The software can be stored in non-volatile memory in the controllers, or they can be loaded into the controllers for execution. Software can be stored on various types of storage media, such as semiconductor memories including dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Instructions that make up the software are executable to perform programmed acts.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. A system comprising:
    a memory bus; and
    a plurality of memory controllers, each memory controller to generate memory requests on the memory bus according to a predetermined priority scheme, the predetermined priority scheme defining time slots, wherein the memory controllers are allocated to respective time slots according to the predetermined priority scheme, and at least two of the plurality of memory controllers adapted to generate concurrently pending memory requests on the memory bus in plural respective time slots;
    wherein one of the at least two memory controllers is adapted to generate its memory request on the memory bus before data is returned for the memory request of the other one of the at least two memory controllers.

2. A system comprising:
a plurality of memory buses;
a hub connected to the plurality of memory buses; and
a plurality of memory controllers connected to a first one of the memory buses, each memory controller to monitor memory requests generated by another memory controller in performing memory-related actions, the memory controllers to access a second one of the memory buses through the hub; and
wherein at least two of the memory controllers are adapted to generate concurrently pending memory requests on the first memory bus, each of the concurrently pending memory requests comprising control information and memory address information and, wherein one of the at least two memory controllers is adapted to generate its memory request including control information and memory address information on the memory bus before data is returned for the memory request of the other one of the at least two memory controllers.

3. A system comprising:
a memory bus; and
a plurality of memory controllers, each memory controller to generate memory requests on the memory bus according to a predetermined priority scheme, the predetermined priority scheme defining time slots, wherein the memory controllers are allocated to respective time slots according to the predetermined priority scheme, at least two of the plurality of memory controllers adapted to generate concurrently pending memory requests on the memory bus in plural respective time slots; and
wherein the predetermined priority scheme enables the memory controllers to gain access to the memory bus without having to assert arbitration requests.

4. A system comprising:
a plurality of memory buses;
a hub connected to the plurality of memory buses;
a plurality of memory controllers connected to a first one of the memory buses, each memory controller to monitor memory requests generated by another memory controller in performing memory-related actions,
the memory controllers to access a second one of the memory buses through the hub; and
wherein the plurality of memory controllers are each adapted to generate memory requests on the first one of the memory buses, each memory controller to monitor memory requests on the fist one of the memory buses generated by another memory controller on the first one of the memory buses.

5. A system comprising:
a plurality of memory buses;
a hub connected to the plurality of memory buses;
a plurality of memory controllers connected to a first one of the memory buses, each memory controller to monitor memory requests generated by another memory controller in performing memory-related actions,
the memory controllers to access a second one of the memory buses through the hub; and
wherein the plurality of memory controllers are each adapted to generate memory requests on the second one of the memory buses, each memory controller to monitor memory requests on the second one of the memory buses generated by another memory controller on the second one of the memory buses.

6. The system of claim 5, wherein the memory controllers are adapted to access any of the memory buses according to a time slot priority scheme that defines a plurality of time slots allocated to respective memory controllers.

7. The system of claim 6, wherein the memory controllers are adapted to access any of the memory buses according to the time slot priority scheme without asserting arbitration requests.

8. A system comprising:
a plurality of memory buses;
a hub connected to the plurality of memory buses;
a plurality of memory controllers connected to a first one of the memory buses, each memory controller to monitor memory requests generated by another memory controller in performing memory-related actions that comprise a read-modify-write transaction,
the memory controllers to access a second one of the memory buses through the hub; and
wherein a first one of the memory controllers is adapted to generate the read-modify-write transaction, the first one of the memory controllers to assert a lock indication for a memory location accessed by the read-modify-write transaction to prevent another one of the memory controllers from accessing the memory location.

9. A system comprising:
a memory bus; and
a plurality of memory controllers, each memory controller to generate memory requests on the memory bus according to a predetermined priority scheme, the predetermined priority scheme defining time slots, wherein the memory controllers are allocated to respective time slots according to the predetermined priority scheme, at least two of the plurality of memory controllers adapted to generate concurrently pending memory requests on the memory bus in plural respective time slots;
wherein the memory bus comprises a first memory bus, the system further comprising;
a hub connected to the first memory bus, and
a second memory bus connected to the hub, at least two of the memory controllers adapted to generate concurrently pending memory requests on the second memory bus through the hub; and
wherein each of the memory request comprises control information and memory address information, the at least two memory controllers adapted to generate concurrently pending memory requests on the second memory bus by providing control information and memory address information of the concurrently pending memory requests on the second memory bus.

10. A system comprising:
a memory bus; and
a plurality of memory controllers, each memory controller to generate memory requests on the memory bus according to a predetermined priority scheme, the predetermined priority scheme defining time slots, wherein the memory controllers are allocated to respective time slots according to the predetermined priority scheme, at least two of the plurality of memory controllers adapted to generate concurrently pending memory requests on the memory bus in plural respective time slots;

wherein the memory bus comprises a first memory bus, the system further comprising;
a hub connected to the first memory bus, and
a second memory bus connected to the hub, at least two of the memory controllers adapted to generate concurrently pending memory requests on the second memory bus through the hub; and wherein each of the memory requests comprises control information and memory address information, the at least two memory controllers adapted to generate concurrently pending memory requests on the first memory bus by providing control information and memory address information of the concurrently pending memory requests on the first memory bus.

11. A method for use in a system having plural memory buses, a hub connected to the memory buses, and a plurality of memory controllers, the method comprising:

generating requests, by the memory controllers, on the memory buses;

each memory controller monitoring memory-related actions on the memory buses connected by the hub by at least another memory controller;

the plurality of memory controllers generating memory requests on a first one of the memory buses; and each memory controller monitoring memory requests on the first one of the memory buses generated by another memory controller on the first one of the memory buses.

12. A method for use in a system having plural memory buses, a hub connected to the memory buses, and a plurality of memory controllers, the method comprising:

generating requests, by the memory controlled on the memory buses;

each memory controller monitoring memory-related actions on the memory buses connected by the hub by at least another memory controller;

the plurality of memory controllers generating memory requests on a second one of the memory buses through the hub; and each memory controller monitoring memory requests on the second one of the memory buses generated by another memory controller on the second one of the memory buses.

13. A method for use in a system having plural memory buses, a hub connected to the memory buses, and a plurality of memory controllers, the method comprises:

generating requests, by the memory controllers, on the memory buses; and each memory controller monitoring memory-related actions on the memory buses connected by the hub by at least another memory controller;

wherein generating the requests on the memory bus comprises at least two of the memory controllers generating concurrently pending requests on the memory bus, each of the concurrently pending requests comprising control information and memory address information, and wherein generating concurrently pending requests comprises one of the at least two memory controllers generating is request including control information and memory address information on the memory bus before data is returned for the request of the other of the at least two memory controllers.

* * * * *

UNITED STATES PATENT AND TRADEMARK OFFICE
CERTIFICATE OF CORRECTION

PATENT NO. : 6,868,486 B1
DATED : March 15, 2005
INVENTOR(S) : Ward, W. P.

It is certified that error appears in the above-identified patent and that said Letters Patent is hereby corrected as shown below:

Column 9,
Line 50, after "the", first occurrence, delete "fist" and insert -- first --.

Column 11,
Line 32, after "memory" delete "controlled" and insert -- controllers --.

Signed and Sealed this

Twentieth Day of December, 2005

JON W. DUDAS
*Director of the United States Patent and Trademark Office*